United States Patent
Li et al.

(10) Patent No.: US 9,426,829 B2
(45) Date of Patent: Aug. 23, 2016

(54) RANDOM ACCESS METHOD AND RECEIVER

(71) Applicant: ZTE CORPORATION, Shenzhen, Guangdong Province (CN)

(72) Inventors: Bin Li, Shenzhen (CN); Xue Wang, Shenzhen (CN); Lei Li, Shenzhen (CN); Hongfeng Qin, Shenzhen (CN); Xiaoxiao Liu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/385,568

(22) PCT Filed: Jul. 23, 2013

(86) PCT No.: PCT/CN2013/079890
§ 371 (c)(1),
(2) Date: Sep. 16, 2014

(87) PCT Pub. No.: WO2013/185674
PCT Pub. Date: Dec. 19, 2013

(65) Prior Publication Data
US 2015/0181622 A1 Jun. 25, 2015

(30) Foreign Application Priority Data
Jul. 23, 2012 (CN) .......................... 2012 1 0255980

(51) Int. Cl.
*H04W 74/08* (2009.01)
*H04W 56/00* (2009.01)
(Continued)

(52) U.S. Cl.
CPC ......... *H04W 74/0833* (2013.01); *H04L 5/1438* (2013.01); *H04L 7/0079* (2013.01); *H04W 56/004* (2013.01); *H04W 56/0055* (2013.01)

(58) Field of Classification Search
CPC . H04L 5/1438; H04L 7/0079; H04W 56/004; H04W 56/0055; H04W 74/0833
USPC .......................................... 370/280
See application file for complete search history.

(56) References Cited

U.S. PATENT DOCUMENTS 5,740,166 A * 4/1998 Ekemark .............. H04B 7/0491
370/331
2007/0149206 A1* 6/2007 Wang ................ H04W 36/0077
455/450

(Continued)

FOREIGN PATENT DOCUMENTS

CN 1394094 A 1/2003
CN 1581729 A 2/2005

(Continued)

OTHER PUBLICATIONS

International Search Report for PCT/CN2013/079890 dated Oct. 10, 2013.

*Primary Examiner* — Chi H Pham
*Assistant Examiner* — Robert Lopata
(74) *Attorney, Agent, or Firm* — Ling Wu; Stephen Yang; Ling and Yang Intellectual Property

(57) ABSTRACT

The embodiments of the present document provide a random access method and a receiver, wherein, the random access method includes: after starting up, a receiver performing cell search and downlink synchronization to obtain a time reference; the receiver obtaining a distance between itself and a base station; the receiver selecting a random access format according to parameters and a load condition of the system where it is located; the receiver obtaining a cell radius supported by the selected random access format, and calculating a line-of-sight transmission time delay if the cell radius is less than the distance; and based on the time reference, the receiver transmitting a random access subframe the line-of-sight transmission time delay in advance.

17 Claims, 2 Drawing Sheets

(51) Int. Cl.
*H04L 5/14* (2006.01)
*H04L 7/00* (2006.01)

(56) References Cited

U.S. PATENT DOCUMENTS

| | | | |
|---|---|---|---|
| 2010/0220666 A1* | 9/2010 | Imamura | H04W 74/002 370/329 |
| 2011/0039499 A1* | 2/2011 | Zhang | H04W 74/008 455/67.11 |
| 2012/0014312 A1* | 1/2012 | Zhang | H04W 56/00 370/312 |
| 2012/0129550 A1* | 5/2012 | Hannan | G01S 5/0036 455/456.1 |
| 2013/0021902 A1* | 1/2013 | Du | H04W 56/00 370/228 |
| 2013/0070726 A1* | 3/2013 | Zhang | H04W 56/0035 370/331 |
| 2014/0126530 A1* | 5/2014 | Siomina | H04W 52/146 370/330 |

FOREIGN PATENT DOCUMENTS

| | | |
|---|---|---|
| CN | 1968202 A | 5/2007 |
| WO | 2005088865 A1 | 9/2005 |

* cited by examiner

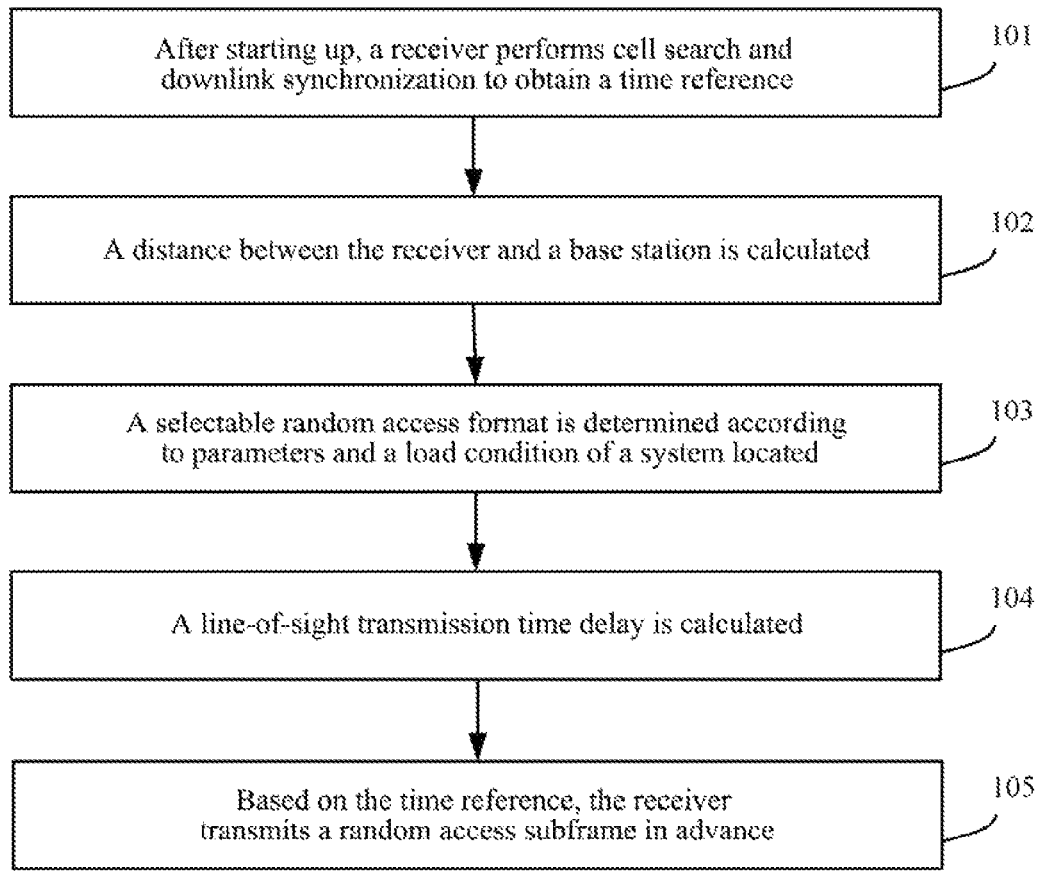

RANDOM ACCESS METHOD AND RECEIVER

TECHNICAL FIELD

The method relates to the mobile communication field, and in particular, to a random access method and a receiver.

BACKGROUND OF THE RELATED ART

In the Long Term Evolution (LTE) system, the random access technology is an important technology of accessing and controlling the user equipment in the communication system, and the receiver finishes uplink timing synchronous correction, user power adjustment and user resource requirement application through a random access process.

The cyclic shift sequence used by the uplink random access preamble of the LTE is the ZC (Zadoff-Chu) sequence, and the random access preamble code is derived by selecting different cyclic shifts based on the ZC sequence. The random access subframe is made up of three parts, respectively a Cyclic Prefix (CP), a random access preamble sequence and a Guard Time (GT), as shown in FIG. 1.

According to the difference of the cell coverage, the required CP lengths are different, and the preambles and the GT lengths are also different. The LTE system supports five formats, including Formats 0-4 respectively, and each format corresponds to a distinct cell coverage. The cell coverage radius is determined by the cyclic shift of the sequence and the GT together.

First of all, the cyclic shift determines whether the cell edge user is able to distinguish different cyclic shift windows, and the selection of the cyclic shift must guarantee that the relevant peak values of the local sequence and the preamble sequence of the cell edge user fall in the time window corresponding to the cyclic shift, and the length of the window is $T_{Ncs}$;

$$T_{Ncs} = \frac{Ncs}{Nzc} \times T_{SEQ} \times \frac{0.01s}{307200Ts}$$

Wherein, Nzc is the length of the ZC sequence; as to Formats 0-3, the value of the Nzc is 839; as to Format 4, the value of the Nzc is 139. $T_{SEQ}$ is the number of sampling points of the RACH preamble sequence.

The cell coverage radius determined by the Ncs can be obtained by the following formula, CellRadius1=$0.5 \times T_{Ncs} \times 3 \times 10^5$ km/s Because the time reference which reaches the receiver has a D1 time delay already after the downlink synchronization is finished, and there is also a D2 time delay after the receiver sends physical random access channel (PRACH) subframe to the base station, wherein, D=D1≈D2; therefore the time window $T_{Ncs}$ corresponding to one cyclic shift needs to absorb two time delays 2D, so the supported cell radius should be reduced by half.

In addition, the cell radius relates to the GT as well, and the lengths of the CP and the GT determine that the random access channel (RACH) subframe of the cell edge user will not disturb the following subframes. There is also the problem of the uplink and downlink time delays 2D, and its calculation formula is as follows:

$$CellRadius2 = 0.5 \times GTnum \times \frac{0.01s}{307200Ts} \times 3 \times 10^5 \text{ km/s}$$

Wherein, GTnum is the number of the sampling points in the guide time.

To sum up, the cell radius is determined by the lengths of the Ncs and the GT together:

CellRadius=min(CellRadius1,CellRadius2)

According to the above-mentioned calculation method, the maximum cell radii supported by Format 0~Format 4 are calculated respectively as shown in Table 1:

| Format | $T_{CP}$ | $T_{SEQ}$ | $T_{GT}$ | Supported cell radius |
|---|---|---|---|---|
| Format 0 | 3168Ts | 24576Ts | 2976Ts | 14.5 km |
| Format 1 | 21024Ts | 24576Ts | 15840Ts | 77 km |
| Format 2 | 6240Ts | 2*24576Ts | 6048Ts | 30 km |
| Format 3 | 21024Ts | 2*24576Ts | 21984Ts | 100 km |
| Format 4 | 448Ts | 4096Ts | 614Ts | 3 km |

In a limit situation, as to Format 3, when the Ncs is 839, the maximum range of the supported cell is 100 km. It can be found out that all of the five formats of the existing LTE PRACH cannot support the over-distance coverage beyond 100 km; while as to the over-distance coverage of the air line, it needs to support the coverage beyond 100 km and even 200 km.

SUMMARY OF THE INVENTION

The embodiment of the present document provides a random access method and a receiver, to solve the problem that the related art cannot support the over-distance coverage beyond 100 km.

The embodiment of the present document provides a random access method, comprising:

after starting up, a receiver performing cell search and downlink synchronization to obtain a time reference;

the receiver obtaining a distance between the receiver and a base station;

the receiver selecting a random access format according to parameters and a load condition of a system where the receiver is located;

the receiver obtaining a cell radius supported by the selected random access format, and calculating a line-of-sight transmission time delay if the cell radius is less than the distance; and based on the time reference, the receiver transmitting a random access subframe the line-of-sight transmission time delay in advance.

Preferably, the receiver obtaining a distance between the receiver and a base station comprises:

the receiver obtaining a location of the receiver by using a positioning system, obtaining a location of the base station according to a location distribution map of the base station and an obtained cell identification, and obtaining the distance between the receiver and the base station according to the location of the receiver and the location of the base station; or the receiver obtaining the distance between the receiver and the base station according to a path loss model, a transmission power of the base station and a reference signal received power value of the receiver.

Preferably, before the receiver obtains the location of the base station according to the location distribution map of the base station and the obtained cell identification, the method further comprises:

the receiver obtaining the cell identification when performing cell search and downlink synchronization.

Preferably, after the receiver obtains the cell radius supported by the selected random access format, the method further comprises:

if the cell radius is greater than the distance, then setting the line-of-sight transmission time delay as zero.

Preferably, the method is applied to a Long Term Evolution system of time division duplex (TDD) and frequency division duplex (FDD).

The embodiment of the present document further provides a receiver, comprising:

an obtaining module, configured to perform cell search and downlink synchronization to obtain a time reference after the receiver starts up; and obtain a distance between the receiver and a base station;

a selection module, configured to select a random access format according to parameters and a load condition of a system where the receiver is located;

a calculation module, configured to obtain a cell radius supported by the selected random access format, and calculate a line-of-sight transmission time delay if the cell radius is less than the distance; and a sending module, configured to, based on the time reference received by the obtaining module, transmit a random access subframe the line-of-sight transmission time delay in advance.

Preferably, the obtaining module is configured to:

obtain a location of the receiver by using a positioning system, obtain a location of the base station according to a location distribution map of the base station and an obtained cell identification, and obtain the distance between the receiver and the base station according to the location of the receiver and the location of the base station; or obtain the distance between the receiver and the base station according to a path loss model, a transmission power of the base station and a reference signal received power value of the receiver.

Preferably, the obtaining module is further configured to: obtain the cell identification when performing cell search and downlink synchronization.

Preferably, the calculation module is further configured to: if the cell radius is greater than the distance, then set the line-of-sight transmission time delay as zero.

Preferably, the receiver is applied to a Long Term Evolution system of time division duplex (TDD) and frequency division duplex (FDD).

The embodiment of the present document, by estimating the downlink time delay from the receiver to the base station in advance, compensates the downlink transmission time delay with the estimated time delay, and expands the coverage radius of the cell; in addition, with the embodiments of the present document, the existing protocol does not need to be amended and the embodiments are totally compatible with the processing mode of the current base station.

BRIEF DESCRIPTION OF DRAWINGS

FIG. 1 is a diagram of a format of a random access subframe of the related art;

FIG. 2 is a flow chart of an embodiment of a random access method of the present document;

PREFERRED EMBODIMENTS OF THE INVENTION

Figure 3:
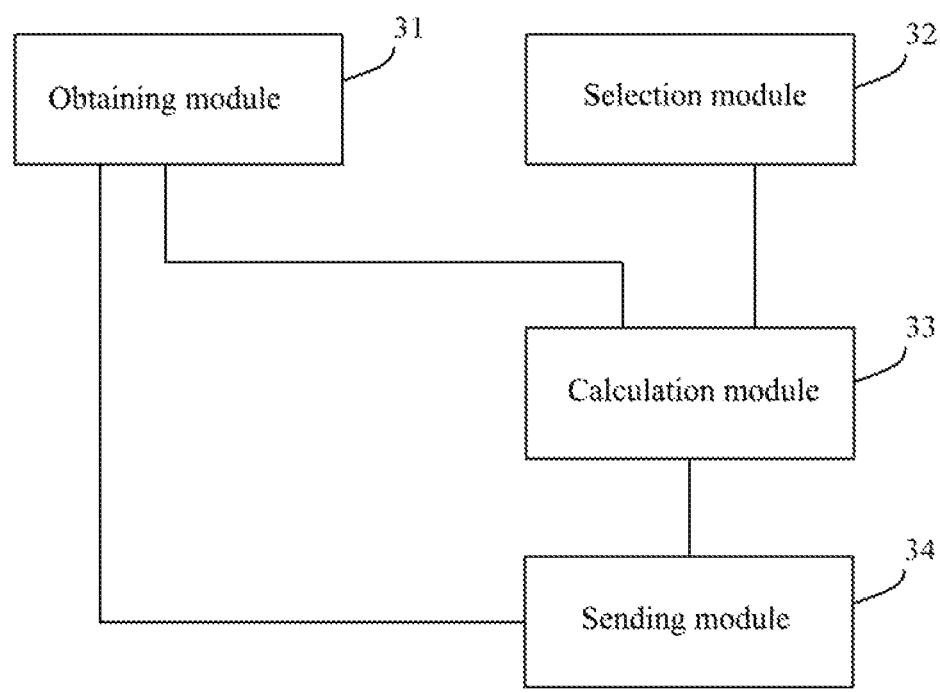
FIG. 3 is a structure diagram of an embodiment of a receiver of the present document.

The embodiments of the present document are described in detail with reference to the accompanying drawings hereinafter. It should be illustrated that, in the case of not conflicting, the embodiments in the present application and features in these embodiments can be combined with each other.

FIG. 2 is a flow chart of an embodiment of a random access method of the present document. The method includes the following steps:

In step 101, after starting up, a receiver performs cell search and downlink synchronization to obtain a time reference $T_0$.

A cell identification can also be obtained through the step 101.

In step 102, a distance r between the receiver and a base station is calculated, and the calculation mode includes but not limited to the following modes.

In mode one, the location of the receiver itself is obtained by adopting an existing positioning system first, such as, GPS positioning or the Big Dipper positioning, and then the location of the base station is determined according to the location distribution map of the base station and the cell ID, and finally the distance between the receiver and the base station r is calculated.

In mode two, r is obtained by means of calculating the path loss; that is, r is calculated according to the path loss model, the transmission power of the base station end, and the Reference Signal Received Power (RSRP) value.

In step 103, a selectable Format is determined according to parameters and a load condition of a system located.

Wherein, the system parameters can include parameters such as a cell radius, a frame structure, etc., and the way of selecting the Format keeps the same with the method of the existing LTE system, and it will no longer go into details here.

In step 104, a line-of-sight transmission time delay T is calculated if the r is greater than the cell radius which can be supported by the selected Format type.

If the selected Format type can support the cell coverage with the distance being r, then let T=0.

In step 105, based on the time reference $T_0$, the receiver transmits a random access subframe the line-of-sight transmission time delay T in advance. Till now, the transmission of the uplink access subframe is completed.

The advanced time delay T can compensate the downlink time delay D1 from the base station to the UE, and at this moment it only needs to consider the uplink time delay D2 when calculating the cell radius covered by the random access, which can support a greater cell coverage.

In addition, the method can be applied to the time division duplex (TDD) and the frequency division duplex (FDD) system.

The above-mentioned method, by estimating the downlink time delay from the receiver to the base station in advance, compensates the downlink transmission time delay with the estimated time delay, and expands the coverage radius of the cell; in addition, the method can guarantee that the existing protocol is not amended, and is totally compatible with the processing mode of the current base station.

Now taking the random access process in the LTE system as an example, the following two embodiments are taken as examples the specific illustration.

Embodiment One

In step 201, after starting up, the receiver performs cell search and downlink synchronization.

By searching the main synchronization sequence, the receiver can obtain the reference time of 5 ms, and then the receiver can obtain the frame synchronization and the physical layer cell group by searching the auxiliary synchronization sequence, and finally the receiver obtains the Identification (ID) of the physical layer cell, so far the downlink synchronization is finished, and the time reference $T_0$ and the cell ID are obtained.

In step 202, the receiver obtains its own location $P_1$ by utilizing the GPS positioning system, and obtains the location of the base station $P_2$ according to the location distribution map of the base station and the cell ID; by $r=|P_1-P_2|$, let $r=200$ km.

In step 203, the random access format is selected to be Format 3 according to the current system parameters and the load condition.

In step 204, compared with Table 1, it can be known that the maximum cell radius which can be supported by Format 3 is $r_0=100$ km; because $r>r_0$, the line-of-sight transmission time delay T is calculated according to the distance r as follows:

$$T=r/(3.0\times10^5 \text{ km/s})=0.667 \text{ ms}.$$

In step 205, the receiver transmits the random access subframe T=0.667 ms in advance on the basis of the current timing moment $T_0$; as to the format of Format 3, the random access coverage radius is calculated, by selecting Ncs=839, Nzc=839, GTnum=15840 Ts, and $T_{SEQ}$=49152 Ts, as follows:

$$CellRadius1 = \frac{Ncs}{Nzc} \times T_{SEQ} \times \frac{0.01s}{307200\,Ts} \times 3\times 10^5 \text{ km/s} = 200 \text{ km}$$

$$CellRadius2 = GTnum \times \frac{0.01s}{307200\,Ts} \times 3\times 10^5 \text{ km/s} = 215 \text{ km}$$

$$CellRadius = \min(CellRadius1, CellRadius2) = 200 \text{ km}.$$

Thus it can be seen that the random access transmits T=0.667 ms in advance, which can meet the over-distance coverage of 200 km.

Embodiment Two

In step 301, after starting up, the receiver performs cell search and downlink synchronization.

By searching the main synchronization sequence, the receiver can obtain the reference time of 5 ms, and then the receiver can obtain the frame synchronization and the physical layer cell group by searching the auxiliary synchronization sequence, and finally the receiver obtains the Identification (ID) of the physical layer cell, so far the downlink synchronization is finished, and the time reference $T_0$ and the cell ID are obtained.

In step 302, the distance between the base station and the receiver is calculated according to a path loss model, a transmission power of the base station and a reference signal received power (RSRP) value of the receiver.

By taking the path loss model in the free space as an example, $$L(\text{dB})=32.4478+20\log_{10}(f)+20\log_{10}(r)$$

wherein, f represents a frequency band (MHz), f=2100 MHz, the transmission power of the base station antenna is $P_b$=50 dBm, the RSRP of the receiver is $P_{RSRP}$=−85 dBm, then L (dB)=$P_b$−$P_{RSRP}$=135 dB. According to the above formula, it can be obtained by calculation that r=64 km.

In step 303, the random access format is selected to be Format 1 according to the current system parameters and the load condition.

In step 304, compared with Table 1, it can be known that the maximum cell radius which can be supported by Format 1 is $r_0$=77 km, and r=64 km, that is, $r<r_0$, therefore, let T=0.

In step 305, because T=0, the random access subframe can be transmitted at the $T_0$ moment; the random access coverage radius is calculated, by selecting the format of Format 1, Ncs=839, Nzc=839, GTnum=15840 Ts, and $T_{SEQ}$=49152 Ts, as follows:

$$CellRadius1 = 0.5\times \frac{Ncs}{Nzc} \times T_{SEQ} \times \frac{0.01s}{307200\,Ts} \times 3\times 10^5 \text{ km/s} = 120 \text{ km}$$

$$CellRadius2 = 0.5 \times GTnum \times \frac{0.01s}{307200\,Ts} \times 3\times 10^5 \text{ km/s} = 77 \text{ km}$$

$$CellRadius = \min(CellRadius1, CellRadius2) = 77 \text{ km}$$

Thus it can be seen that the random access method can meet the cell coverage of 64 km.

As shown in FIG. 3, it is the structure diagram of the embodiment of the receiver of the present document. The receiver includes an obtaining module 31, a selection module 32, a calculation module 33 and a sending module 34, wherein, the obtaining module 31 is configured to perform cell search and downlink synchronization to obtain a time reference after the receiver starts up; and obtain a distance between the receiver and a base station;

the selection module 32 is configured to select a random access format according to parameters and a load condition of a system where the receiver is located;

the calculation module 33 is configured to obtain a cell radius supported by the selected random access format, and calculate a line-of-sight transmission time delay if the cell radius is less than the distance; and the sending module 34 is configured to, based on the time reference received by the obtaining module, transmit a random access subframe the line-of-sight transmission time delay in advance.

In addition, the above-mentioned calculation module 33 is further configured to: if the cell radius is greater than the distance, set the line-of-sight transmission time delay as zero.

Wherein, the above-mentioned obtaining module is configured to: obtain a location of the receiver by using a positioning system, obtain a location of the base station according to a location distribution map of the base station and an obtained cell identification, and obtain the distance between the receiver and the base station according to the location of the receiver and the location of the base station; or obtain the distance between the receiver and the base station according to a path loss model, a transmission power of the base station and a reference signal received power value of the receiver.

In order to enable the above-mentioned obtaining module to obtain the location of the base station according to the location distribution map of the base station and the obtained cell identification, the obtaining module 31 is further configured to: obtain the cell identification when performing cell search and downlink synchronization.

The above-mentioned receiver is applied to a Long Term Evolution system of time division duplex (TDD) and frequency division duplex (FDD).

In addition, the embodiment of the present document further provides a terminal including the above-mentioned receiver.

The above-mentioned receiver and terminal, by estimating the downlink time delay from itself to the base station in advance, compensate the downlink transmission time delay with the estimated time delay, and expand the coverage radius of the cell; in addition, the existing protocol does not need to be amended, and the above-mentioned receiver and terminal are totally compatible with the processing mode of the current base station.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above-mentioned embodiments are only used to illustrate the technical scheme of the present document while not used to limit, and the present document is described in details only referring to the preferable embodiments. Those skilled in the art should understand that they can make the modifications and equivalents according to the technical scheme of the present document without departing from the spirit and scope of the present document, the modifications and equivalents should be embodied in the scope of the appended claims of the present document.

INDUSTRIAL APPLICABILITY

The embodiment of the present document, by estimating the downlink time delay from the receiver to the base station in advance, compensates the downlink transmission time delay with the estimated time delay, and expands the coverage radius of the cell; in addition, when adopting the embodiments of the present document, the existing protocol doe not need to be amended, and the embodiments are totally compatible with the processing mode of the current base station.

What we claim is:

1. A random access method, comprising:
    after starting up, a receiver performing cell search and downlink synchronization to obtain a time reference;
    the receiver obtaining a distance between the receiver and a base station;
    the receiver selecting a random access format according to parameters and a load condition of a system where the receiver is located;
    the receiver obtaining a cell radius supported by the selected random access format, and calculating a line-of-sight transmission time delay if the cell radius is less than the distance; and
    based on the time reference, the receiver transmitting a random access subframe the line-of-sight transmission time delay in advance.

2. The method according to claim 1, wherein,
    the receiver obtaining a distance between the receiver and a base station comprises:
    the receiver obtaining a location of the receiver by using a positioning system, obtaining a location of the base station according to a location distribution map of the base station and an obtained cell identification, and obtaining the distance between the receiver and the base station according to the location of the receiver and the location of the base station; or
    the receiver obtaining the distance between the receiver and the base station according to a path loss model, a transmission power of the base station and a reference signal received power value of the receiver.

3. The method according to claim 2, wherein,
    before the receiver obtains the location of the base station according to the location distribution map of the base station and the obtained cell identification, the method further comprises:
    the receiver obtaining the cell identification when performing cell search and downlink synchronization.

4. The method according to claim 1, wherein,
    after the receiver obtains the cell radius supported by the selected random access format, the method further comprises:
    if the cell radius is greater than the distance, setting the line-of-sight transmission time delay as zero.

5. The method according to claim 1, wherein,
    the method is applied to a Long Term Evolution system of time division duplex (TDD) and frequency division duplex (FDD).

6. A receiver, comprising: a processor, and a storage device for storing computer executable instructions that when executed by the processor cause the processor to perform the steps in following modules:
    an obtaining module, configured to perform cell search and downlink synchronization to obtain a time reference after the receiver starts up; and obtain a distance between the receiver and a base station;
    a selection module, configured to select a random access format according to parameters and a load condition of a system where the receiver is located;
    a calculation module, configured to obtain a cell radius supported by the selected random access format, and calculate a line-of-sight transmission time delay if the cell radius is less than the distance; and
    a sending module, configured to, based on the time reference received by the obtaining module, transmit a random access subframe the line-of-sight transmission time delay in advance.

7. The receiver according to claim 6, wherein,
    the obtaining module is configured to:
    obtain a location of the receiver by using a positioning system, obtain a location of the base station according to a location distribution map of the base station and an obtained cell identification, and obtain the distance between the receiver and the base station according to the location of the receiver and the location of the base station; or
    obtain the distance between the receiver and the base station according to a path loss model, a transmission power of the base station and a reference signal received power value of the receiver.

8. The receiver according to claim 7, wherein,
    the obtaining module is further configured to: obtain the cell identification when performing cell search and downlink synchronization.

9. The receiver according to claim 6, wherein,
    the calculation module is further configured to: if the cell radius is greater than the distance, set the line-of-sight transmission time delay as zero.

10. The receiver according to claim 6, wherein,
    the receiver is applied to a Long Term Evolution system of time division duplex (TDD) and frequency division duplex (FDD).

11. A terminal, comprising a receiver described in claim 6.

12. The method according to claim 2, wherein,
    the method is applied to a Long Term Evolution system of time division duplex (TDD) and frequency division duplex (FDD).

13. The method according to claim 3, wherein,
the method is applied to a Long Term Evolution system of time division duplex (TDD) and frequency division duplex (FDD).

14. The method according to claim 4, wherein,
the method is applied to a Long Term Evolution system of time division duplex (TDD) and frequency division duplex (FDD).

15. The receiver according to claim 7, wherein,
the receiver is applied to a Long Term Evolution system of time division duplex (TDD) and frequency division duplex (FDD).

16. The receiver according to claim 8, wherein,
the receiver is applied to a Long Term Evolution system of time division duplex (TDD) and frequency division duplex (FDD).

17. The receiver according to claim 9, wherein,
the receiver is applied to a Long Term Evolution system of time division duplex (TDD) and frequency division duplex (FDD).

\* \* \* \* \*